June 22, 1965 J. K. HARKER 3,191,025
HEADLIGHT ADAPTER
Filed May 7, 1963

Joseph K. Harker
INVENTOR.

BY *Clarence A. O'Brien*
*and Harvey B. Jacobson*
Attorneys 3,191,025
HEADLIGHT ADAPTER
Joseph K. Harker, 2784 East 3400 South,
Salt Lake City, Utah
Filed May 7, 1963, Ser. No. 278,702
2 Claims. (Cl. 240—46.57)

This invention primarily relates to a fog, smog or snow lens attachment to be placed over the conventional sealed beam headlights of an automotive vehicle.

It is desirable when a moist condition exists in the atmosphere to attach to the existing headlights of automotive vehicles an adapter so that the road surface may be properly illuminated. In the case where such moisture exists in the atmosphere, small water drops suspended in the air or large drops falling through the air in sufficient density will reflect the normal white light projected by the sealed beam unit to such an extent that a back glare is produced, while illumination in front of the vehicle ceases. It has been found that this condition may be greatly improved by using monochromatic light of shorter wave lengths such as amber colored light. Such amber colored light, however, is not suitable for normal use as it reduces the obtainable illumination to a large extent. Therefore, this type of light is only usable when the fog, smog or snow conditions exist. Accordingly, it is therefore a primary object of this invention to provide an amber plastic lens to fit all sealed beam units found to be used in modern automotive vehicles and one which is capable of quick and easy attachment and detachment according to the particular driving conditions.

Another object of this invention is to provide a lens attachment of the character indicated which is adapted to tightly seal the outer face of the headlight to the vehicle so that no moisture may cover the same. This seal is attained by means of a plurality of spring clips adapted to fit over the headlight rim.

A still further object of this invention resides in the provision of means molded on the attachment or adapter which conforms to the surface irregularities usually associated with the headlight itself to thereby quickly position and align the adapter with the headlight.

Yet another object of this invention resides in its simplicity of construction, efficiency of use and ease of manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
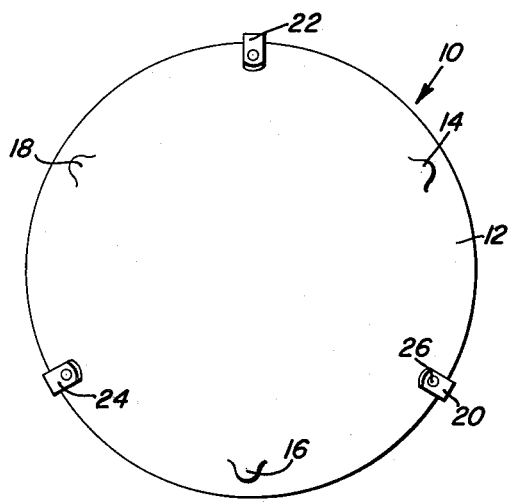
FIGURE 1 is a front view in elevation of the headlight adapter comprising the subject matter of the instant invention.

Referring now to the drawings in detail, the headlight adapter comprising the subject matter of the instant invention is generally designated by the numeral 10 and comprises a molded lens 12 adapted to pass monochromatic light. The lens 12 is usually chosen so as to pass amber light.

Lens 12 is molded in the same manner as the conventional headlight lenses of an automobile. In the molding process, certain surface irregularities are formed on these lenses such as depressions indicated by the numerals 14, 16, and 18. Therefore, in positioning the headlight adapter or attachment 10 upon the headlight of the automobile, the corresponding surface irregularities can be matched and received by the adapter to quickly align and position the attachment upon the headlight.

Spaced at predetermined points about the circumference of the lens 12 are a plurality of spring steel straps such as 20, 22 and 24 riveted to the lens as shown for example at 26. Each of these straps include a horizontal leg portion such as 28 and an angular portion 30 which is riveted to the lens.

Figure 3:
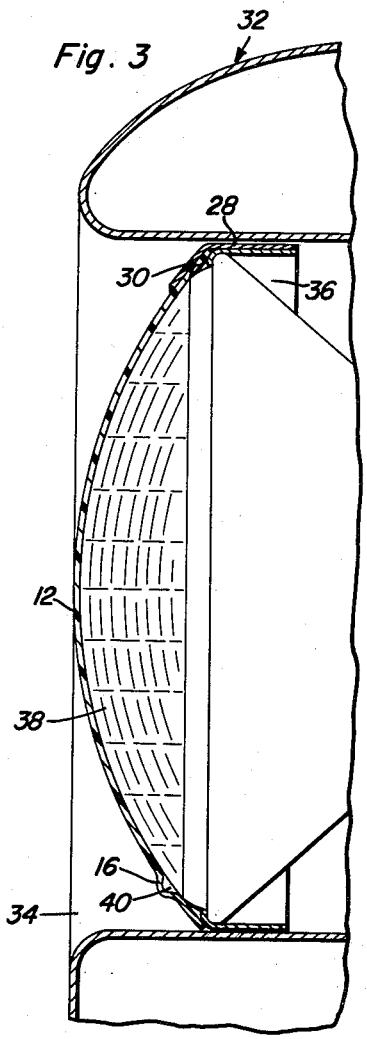
FIGURE 3 is a sectional view through a sealed beam unit of a modern type automobile showing the headlight adapter mounted on the standard sealed beam headlights.
Figure 2:
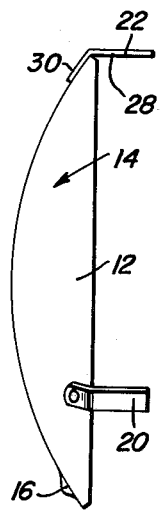
FIGURE 2 is a side view in elevation of the adapter.

Referring now to FIGURE 3, an automotive vehicle such as 32 is generally indicated which comprises a recess such as 34 in which a sealed beam headlight unit including a headlight rim 36 and a headlight 38 are mounted. As shown, the lens 12 is adapted to be placed upon the headlight 38 by snapping the spring steel straps over the headlight rim 36. The adapter is quickly and efficiently aligned and snugly held against the headlight 38 by positioning the depressions 14 to 16 in such a manner as to receive depressions or irregularities such as 40 usually formed in the headlight.

It should be appreciated that the headlight adapter is specifically useful with modern day automobile units which have a headlight rim encased within a recess wherein the rim is of such a dimension as to leave a narrow space between it and the automotive body. This is accomplished due to the novel shape of the spring steel straps. Of course, the dimensions of the headlight itself may vary in certain models of automobiles and therefore it is contemplated that the adapters can be made in corresponding sizes.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with an automotive vehicle having a circular headlight including a convex spherical lens and mounted in a generally cylindrical rim confined within a generally cylindrical recess in the vehicle, the space between the walls of said recess and the rim being generally cylindrical and thin in radial width, a headlight adapter comprising a convex spherical lens for passing monochromatic light, means securing said adapter lens over the outer convex surface of said headlight lens with the concave surface of said adapter lens disposed in surface-to-surface engagement with the convex surface of said headlight lens, said means including a plurality of resilient straps circumferentially spaced at predetermined points about the adapter lens, each of said straps having a first straight leg terminating at one end in a second angulated leg, said legs being attached to the outer convex surface of said adapter lens with said second lens extending generally radially of said adapter lens from the outer periphery thereof and said first legs embracing the outer periphery of said adapter lens and said headlight rim therebetween and frictionally received in said space between the confronting walls of said recess and the rim, said headlight lens including a plurality of aligning members at points spaced circumferentially about its outer periphery projecting outwardly from its convex surface, said adapter lens including a plurality of deformed portions spaced circumferentially about its outer periphery with each deformed portion defining a recess opening outwardly of the concave surface of said adapter lens and snugly and seatingly receiving the corresponding aligning member carried by said headlight lens.

2. The combination of claim 1 wherein said second legs are riveted to the outer surface of the peripheral edge portions of said adapter lens.

References Cited by the Examiner

UNITED STATES PATENTS

| | | | |
|---|---|---|---|
| D. 152,807 | 2/49 | Latousek | 240—46.59 |
| 1,163,590 | 12/15 | Dobes | 240—46.59 |
| 1,167,824 | 1/16 | Hunt | 240—46.59 |
| 2,476,109 | 7/49 | Neitzel | 240—46.59 |
| 2,539,819 | 1/51 | Dominick | 240—46.59 |
| 2,791,680 | 5/57 | Bailey | 240—46.59 |
| 2,910,575 | 10/59 | Meschwitzer | 240—41 |

NORTON ANSHER, *Primary Examiner.*

EMIL G. ANDERSON, *Examiner.*